May 6, 1958 A. FETZ 2,833,911
WELDING ORGANIZATION
Filed Sept. 8, 1953 3 Sheets-Sheet 1

INVENTOR.
ALFRED FETZ
BY
ATTORNEYS.

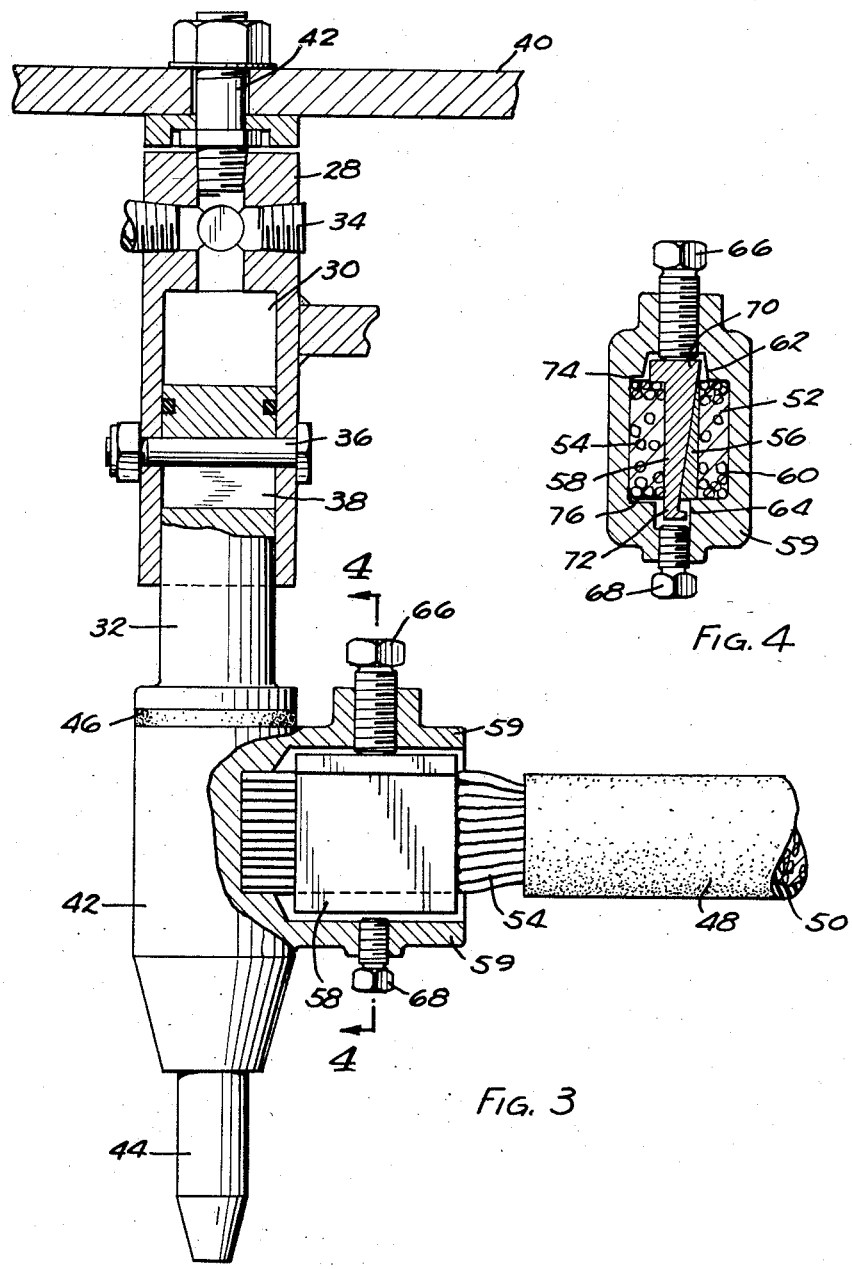

May 6, 1958 A. FETZ 2,833,911
WELDING ORGANIZATION
Filed Sept. 8, 1953 3 Sheets-Sheet 3

INVENTOR.
ALFRED FETZ
BY
ATTORNEYS.

2,833,911
Patented May 6, 1958

2,833,911

WELDING ORGANIZATION

Alfred Fetz, Detroit, Mich.

Application September 8, 1953, Serial No. 378,817

5 Claims. (Cl. 219—89)

This invention relates to welding organization and more particularly to welding pressure regulation in pressure type welding machines.

It is an object of this invention to provide a control unit for regulating the welding pressure applied to a work piece which is of simple construction and which enables accurate control of welding pressure over a wide range.

A further object of the invention resides in the provision of a single control unit adapted to control the pressure exerted by a plurality of welding electrodes in a pressure type welding machine.

A further object of the invention resides in the provision of an improved electrical connection in a welding machine between the electrode and the cable which supplies the welding current thereto.

Still another object of the invention is to provide an electrode construction incorporating improved means for producing a follow-up action of the electrode in effecting a pressure type weld.

In the drawings:

Fig. 3 is a fragmentary view, partly in section, of an electrode assembly of this invention.

Fig. 4 is a sectional view along the line 4—4 of Fig. 3.

Figure 1:
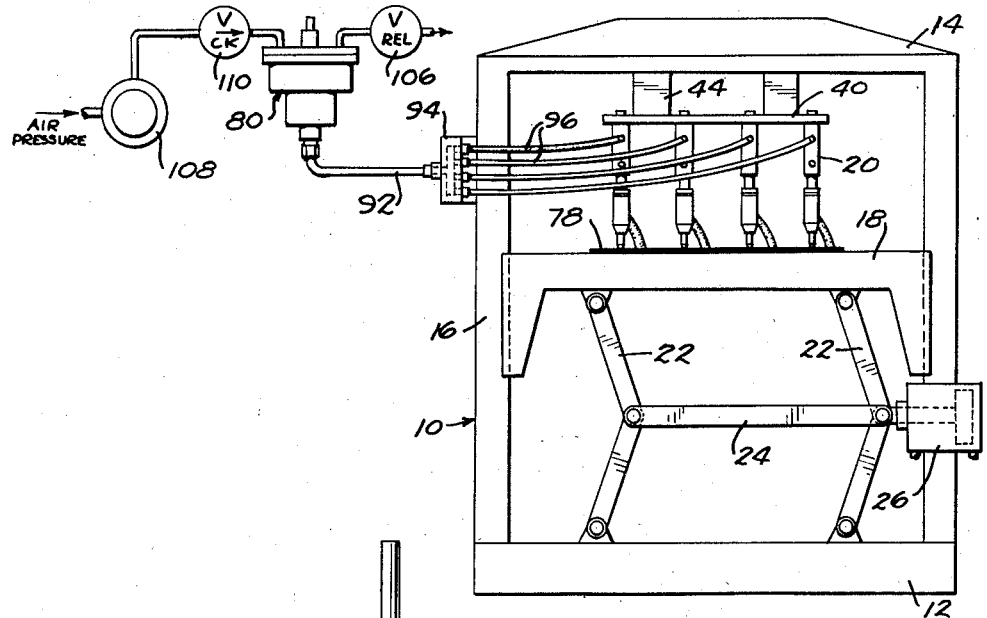
Fig. 1 shows one form of pressure type welding machine provided with the pressure regulating unit of this invention.

In Fig. 1 a pressure welding machine is generally designated at 10. The machine includes a base 12, a head 14, supported on the base 12 by frame members 16 and a vertically movable platen 18. On the head 14 there is supported a series of welding guns 20. Platen 18 is arranged to be raised and lowered by means of scissors type links 22 connected with a piston rod 24 of an air cylinder 26. Cylinder 26 is arranged to be supplied with air under pressure from any convenient source not shown.

Referring now to Fig. 3 the welding gun 20 includes a cylinder 28 provided with a bore 30 in which a plunger 32 is movable. Cylinder 28 is provided with one or more conveniently located ports 34 for supplying oil or other hydraulic liquid to the bore 30. A pin 36 extends transversely through bore 30 and plunger 32 has an axially elongated slot 38 therein in which the pin 36 is located. The pin and slot connection between plunger 32 and cylinder 28 limits the extent to which the plunger is movable axially in bore 30 and prevents rotation of the plunger in the bore.

At its upper end cylinder 28 is connected with a supporting plate 40 by means of a threaded stud 42. Plate 40 is fixedly supported on head 14 of the machine as by brackets 44.

Cylinder 28 and plunger 32 provide, in effect, a support for the electrode holder which is designated at 42. Electrode holder 42 is provided with a replaceable electrode 44 at its lower end and is connected with plunger 32 by means of a rubber pad 46 which is cemented to the upper end face of holder 42 and the lower end face of plunger 32.

For supplying welding current to the electrode there is provided a conductor cable 48. Cable 48 comprises an outer insulating sleeve 50 and two flat braided wire sections 52 and 54. To the end of section 52 there is soldered a wedge 56 and to the end of section 54 there is soldered a wedge 58. Wedges 56 and 58 are soldered to the adjacent side faces of the braided sections 52 and 54 so that they may be disposed as shown in Fig. 4. Holder 42 is fashioned at one side thereof with a laterally projecting hub 59.

Hub 59 is formed with a generally rectangular socket 60 therein. At its upper side socket 60 is extended to form a recess 62 and at its lower side the socket is fashioned with a recess 64. Screws 66 and 68 are threaded on boss 59 so that they can be advanced into or retracted from the sockets 62 and 64 respectively.

Wedge 58 is fashioned at its upper end with a head portion 70 and at its lower end with a head portion 72. The cable sections 52 and 54 and the wedge members 56 and 58 are dimensioned such that when the ends of the cable are held together to bring the tapered surfaces of the two wedges into co-planar engagement the cable end may be inserted within the socket 60 of the boss 59.

It will be observed that the cable section 54 has clearance with socket 60 along the upper and lower edges thereof, as shown at 74 and 76. Thus, when screw 66 is tightened, wedge 58 is driven downwardly to thereby increase the effective width of the cable end and thereby cause the cable sections 52 and 54 to contact the sides of socket 60 with considerable pressure. Cable section 52 and wedge 56, it will be observed, are prevented from shifting downwardly when screw 66 is tightened by reason of the rather close fit of these members with the upper and lower edges of socket 60.

When it is desired to release the cable from holder 42 screw 66 is retracted from socket 60 and screw 68 is threaded into socket 60 so as to contact the lower head 72 of wedge 58 and thereby shift the wedge and its associated cable section 54 upwardly and thereby reduce the effective width of the cable and so as to permit it to be withdrawn from within socket 60.

In order to control the pressure exerted by the electrode 44 on the work piece 78 supported on platen 18, there is provided a pressure regulating unit generally designated 80. The unit 80 comprises a cylinder 81 having a large bore 82 and a small bore 84. Within these bores there is arranged a two-part piston which includes a hollow sleeve member 86 having a piston head 88 at its lower end which is slidably received in bore 84. A larger piston 90 is mounted on sleeve 86 in an axially fixed position and is slidable in bore 82. The lower end of bore 84 is connected by a conduit 92 with a manifold or reservoir 94 which is in turn connected by separate conduits 96, one with the port 34 of each cylinder 28 on the welding gun 20. The closed system between the upper end of piston 32 in cylinder 28 and the lower end of piston 88 in the cylinder bore 84 is filled with a hydraulic fluid such as oil.

Sufficient oil is charged into the system so as to extend upwardly in sleeve 86 to provide a reservoir of oil in sleeve 86 for replenishing any oil in the system which may leak out. A float 98 rests upon the upper surface of the oil in sleeve 86 and provides a means for indicating when the oil in the system must be replenished. At its lower end piston 88 is provided with a check valve 100 for closing the lower end of hollow sleeve 86 when the oil 84 is under pressure.

The upper end of cylinder 81 is provided with an air inlet port 102 and an air outlet port 104. Port 104 is connected with an adjustable relief valve 106 and port 102 is connected with a source of air under pressure through a pressure regulating valve 108 and a check valve 110.

In operation, the work to be welded is positioned on platen 18 and the air cylinder 26 is operated to cause the platen to be elevated into contact with the eletcrodes 44. As the platen is elevated into contact with electrodes 44 plungers 32 are driven upwardly in bores 30 of cylinders 28 thus displacing oil through the lines 96, reservoir 94 and line 92 to the cylinder bore 84. The oil thus displaced causes the piston 88 to move upwardly in bore 84. This reduces the volume of bore 82 above piston 90 and, therefore, increases the air pressure in this chamber. The air pressure in this chamber is originally set by pressure regulating valve 110 and when the pressure reaches a value controlled by the setting of relief valve 106 the maximum pressure will have been obtained and this, in turn, will control the welding pressure exerted by the electrodes 44 on the work piece. This welding pressure is, of course, dependent on the ratio of the diameter of piston 90 to the diameter of piston 88.

The number of welding guns controlled by the unit 80 will require the regulation of the line pressure by means of valve 110. The greater number of guns will displace a larger amount of oil into the bore 84 of cylinder 81 and will therefore require a longer stroke of pistons 88 and 90 for a given welding pressure. Thus as the number of welding guns are increased the air pressure applied in the chamber above piston 90 is adjusted to a lower value by valve 110.

Figure 2:
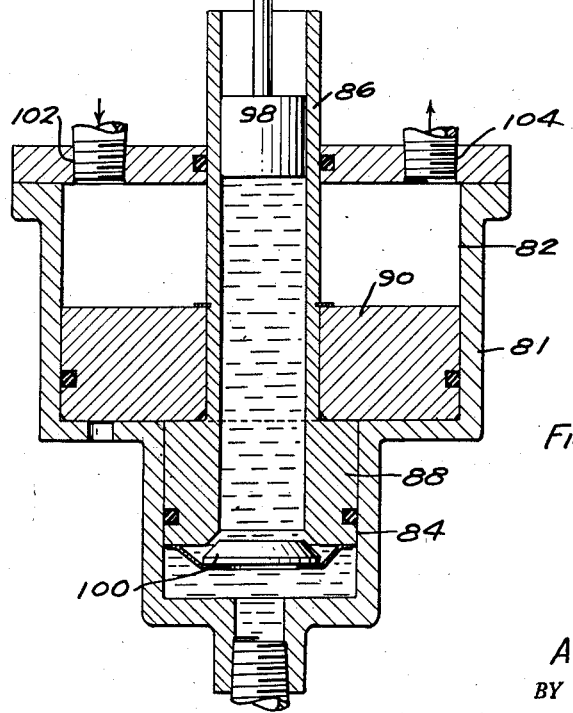
Fig. 2 is a sectional view of the pressure regulating unit of this invention.

When the platen 18 of the welding machine is in the down-position there will be no pressure in the hydraulic system and the air pressure in cylinder 81 will cause the pistons 88 and 90 to move down to their lowermost position shown in Fig. 2. Check valve 100 will open and any loss of oil in the hydraulic system will be replaced thus eliminating the danger of air accumulation in the hydraulic line. As soon as the hydraulic pressure is built up by reason of the upward movement of the plungers 32 in the gun cylinders 28, relief valve 100 will close.

When the electrode 44 is brought into contact with the work piece and welding current is permitted to flow therethrough, the metal of the work piece becomes softened and tends to squeeze outwardly at the locus of the weld. The rubber pad 46 which is compressed during the welding operation because of the welding pressure applied thereto immediately expands and causes the electrode 44 to "follow through," thus insuring the maintenance of the welding pressure for the duration of the welding operation.

Figure 5:
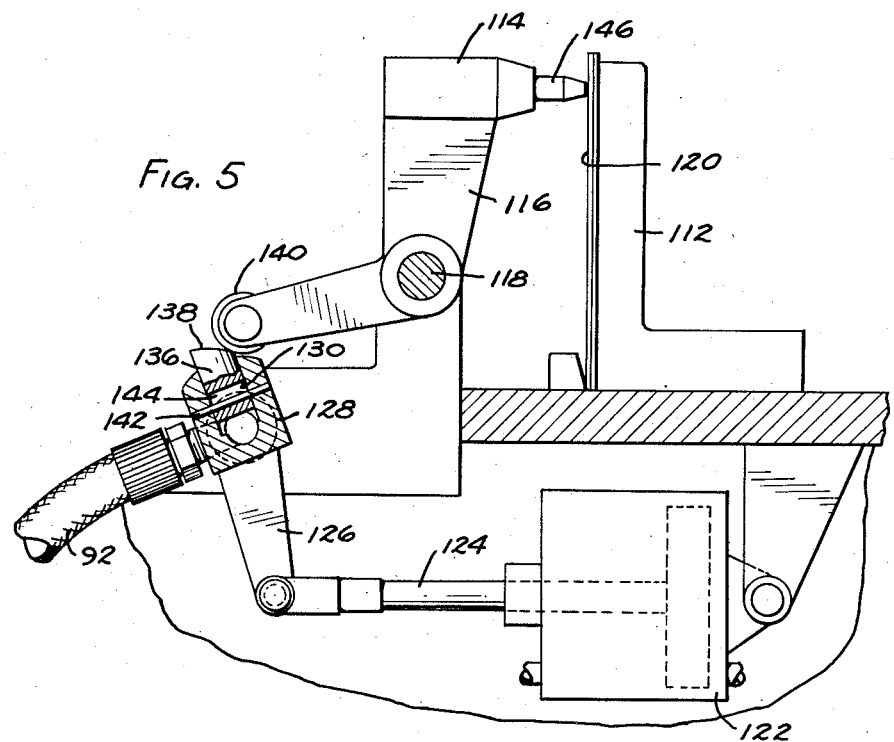
Fig. 5 shows the manner in which the pressure regulating system of this invention can be applied to another form of pressure welding machine.
Figure 6:
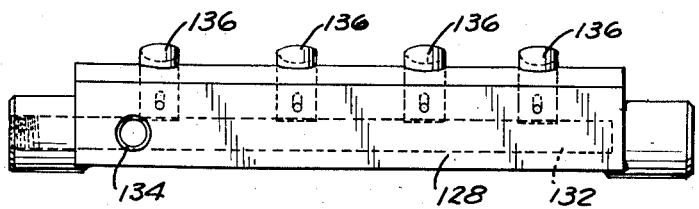
Fig. 6 is an elevational view of the cam shaft member shown in Fig. 5.

Figs. 5 and 6 illustrate the manner in which the control unit of this invention can be applied to a welding machine of the type wherein the electrodes are mounted on rocker arms that are actuated by cams. In the machine illustrated the support for the work piece is shown at 112. The electrode holders 114 are mounted at one end of rocker arms 116 which are pivoted to the frame of the machine as at 118. The electrode holders 114 are moved into pressure contact with the work piece 120 on support 112 by means of an air cylinder 122, the piston rod 124 of which is connected with a crank 126 on a cam shaft 128. Shaft 128 is provided with a plurality of bores 130 which communicate with an axial bore 132 into which the conduit 92 from the pressure regulating unit 80 is connected through the port 134. Within each of the bores 130 there is arranged a plunger 136, the outer end of which is provided with a cam surface 138 arranged to co-act with a roller 140 at the other end of rocker arms 116. Pins 142 are arranged to extend through elongated slots in plungers 136 to limit the movement of the plungers within the bores 130 and prevent rotation thereof.

In the arrangement shown in Figs. 5 and 6, when air cylinder 122 is operated to project the piston rod 124 outwardly of the cylinder the shaft 128, which is journalled at each end in the frame of the machine, is caused to rotate in a clockwise direction. Rollers 140 are engaged by the cam surfaces 138 to bring the electrodes 146 into pressure contact with the work piece 120. This causes the plungers 136 to move in a direction inwardly of the bores 130 and thereby displace oil from the bores 130 through the line 92 back to the bore 84 below piston 88 in cylinder 81. The displacement of oil continues until the oil pressure is balanced by the air pressure in the chamber above piston 90 in cylinder 81, and the welding pressure exerted by electrode 146 against the work piece 120 is therefore controlled in a manner similar to that previously discussed with reference to the previous form of welding machine described.

It will thus be seen that the pressure control unit described herein permits an accurate and a wide range of welding control pressure without the necessity of a hydraulic pump unit in the system. Since double acting guns are not required, the piston and the piston rod of the welding gun can be made the same diameter such as illustrated by the plunger 32 in Fig. 3. Thus the guns can be made smaller, more compact, and of stronger construction. This also enables the guns to be spaced more closely together where a series of closely spaced welds are required.

I claim:

1. In a welding machine, the combination of a work support, an electrode support, an electrode on said last named support, a hydraulic cylinder, a piston movable in said hydraulic cylinder, means for relatively moving said supports for bringing said electrode into pressure contacting relation with a work piece to be welded on said work support, means operably connecting said electrode and piston and responsive to pressure engagement of said electrode and work to relatively move said piston and cylinder in a direction tending to discharge hydraulic fluid from said cylinder at one side of said piston, a second cylinder and a piston movable therein, said second cylinder communicating on one side of said second piston with said one side of said first cylinder whereby the hydraulic fluid discharged from said one side of said first cylinder is caused to flow into said one side of said second cylinder to thereby displace said second piston in said second cylinder, the portion of said second cylinder on the other side of said piston comprising an air compression chamber, means for controlling the pressure of the air in said air compression chamber to a predetermined maximum value whereby the contact pressure of said electrode on said work piece is proportional to said predetermined maximum pressure, said last mentioned means comprising a source of air under pressure and a relief value connected with the other side of said second cylinder, and means for regulating the pressure from said source of air under pressure for varying the extent to which said second piston is displaced before said relief valve is effective to relieve the pressure in said other side of said second cylinder.

2. A welding machine comprising a support on which a work piece to be welded is arranged to be supported, an electrode support, an electrode on said support, means for relatively moving said supports to bring the electrode into pressure contacting relation with a work piece on said support, said electrode having a portion forming a plunger, a hydraulic cylinder slidably receiving said plunger and mounted on said electrode support, the arrangement being such that when said electrode and said work support are brought into pressure contacting relation, said plunger moves in a direction to discharge hydraulic fluid from one end of said cylinder, a second cylinder having a piston therein dividing the cylinder into two chambers, means connecting one of said chambers with said end of the first cylinder such that hydraulic fluid discharged from said first cylinder is caused to flow into said one chamber to displace the piston in said second cylinder and thereby cause said one chamber to enlarge and the other chamber to diminish in size, a source of air under the pressure communicating with said other chamber, means for preventing air pressure in said other chamber for exceeding a predetermined maximum, and means for regulating the pressure from said source of air under pressure to said other chamber.

3. The combination set forth in claim 2 wherein said last mentioned means comprises an adjustable relief valve.

4. In a welding machine, the combination of a support, a rocker arm pivotally mounted on said support, a welding electrode on said rocker arm and movable toward and away from said support when said rocker arm is pivoted in opposite directions, a rotatable cam shaft having a bore, a cam on said shaft, said cam comprising a plunger in said bore engageable with said rocker arm to pivot the electrode into pressure contacting relation with said support when said shaft is rotated, a cylinder, a piston in said cylinder dividing the cyinder into two chambers, one of said chambers communicating with said bore in said shaft, hydraulic fluid filling said one chamber and said bore such that when the plunger is moved in said bore the hydraulic fluid displaced therefrom is caused to flow into said one chamber to thereby displace said piston, means for maintaining said superatmospheric air pressure in said other chamber and means for controlling the maximum air pressure obtaining in said other chamber to a predetermined value.

5. In a welding machine, the combination of a work support, an electrode, a hydraulic cylinder, a piston movable in said hydraulic cylinder, means for bringing said electrode into pressure contacting relation with a work piece to be welded on said support, means operably connecting said electrode and piston whereby when the electrode and the work piece on said support are brought into pressure contacting relation said piston and cylinder are relatively moved in a direction tending to discharge hydraulic fluid from said cylinder, a second cylinder and a piston movable therein, said second cylinder communicating on one side of said second piston with said first cylinder whereby the hydraulic fluid discharged from said first cylinder is caused to flow into said one side of said second cylinder to thereby displace said second piston in said second cylinder, and means for controlling the pressure on the other side of said second piston to a predetermined maximum value whereby the contact pressure of said electrode on said work piece is proportional to said predetermined maximum pressure, said second piston being provided with a hollow stem, the hollow portion of said stem communicating with said one side of said cylinder and including a check valve for preventing hydraulic fluid from flowing into said hollow stem when the hydraulic fluid in the said one side of said second cylinder is at a pressure greater than the pressure head of said fluid in said hollow stem.

References Cited in the file of this patent

UNITED STATES PATENTS

| | | |
|---|---|---|
| 1,975,683 | Childs | Oct. 2, 1934 |
| 2,256,246 | Geibel | Sept. 16, 1941 |
| 2,283,826 | Soehner | May 19, 1942 |
| 2,286,104 | Platz | June 9, 1942 |
| 2,295,925 | Biederman | Sept. 15, 1942 |
| 2,302,748 | Roza | Nov. 24, 1942 |
| 2,339,354 | Rubel | Jan. 18, 1944 |
| 2,354,313 | Harris | July 25, 1944 |
| 2,392,296 | Seeloff | Jan. 1, 1946 |
| 2,470,074 | Manning | May 20, 1949 |
| 2,474,593 | Putnam | June 28, 1949 |
| 2,482,023 | Opitz | Sept. 13, 1949 |
| 2,498,492 | Heuschkel | Feb. 21, 1950 |